Aug. 16, 1966    P. S. LITT    3,266,630
APPARATUS FOR PURIFYING WATER
Filed May 28, 1962    2 Sheets-Sheet 1

INVENTOR.
Peter S. Litt
BY
Watson D. Harbaugh
Atty.

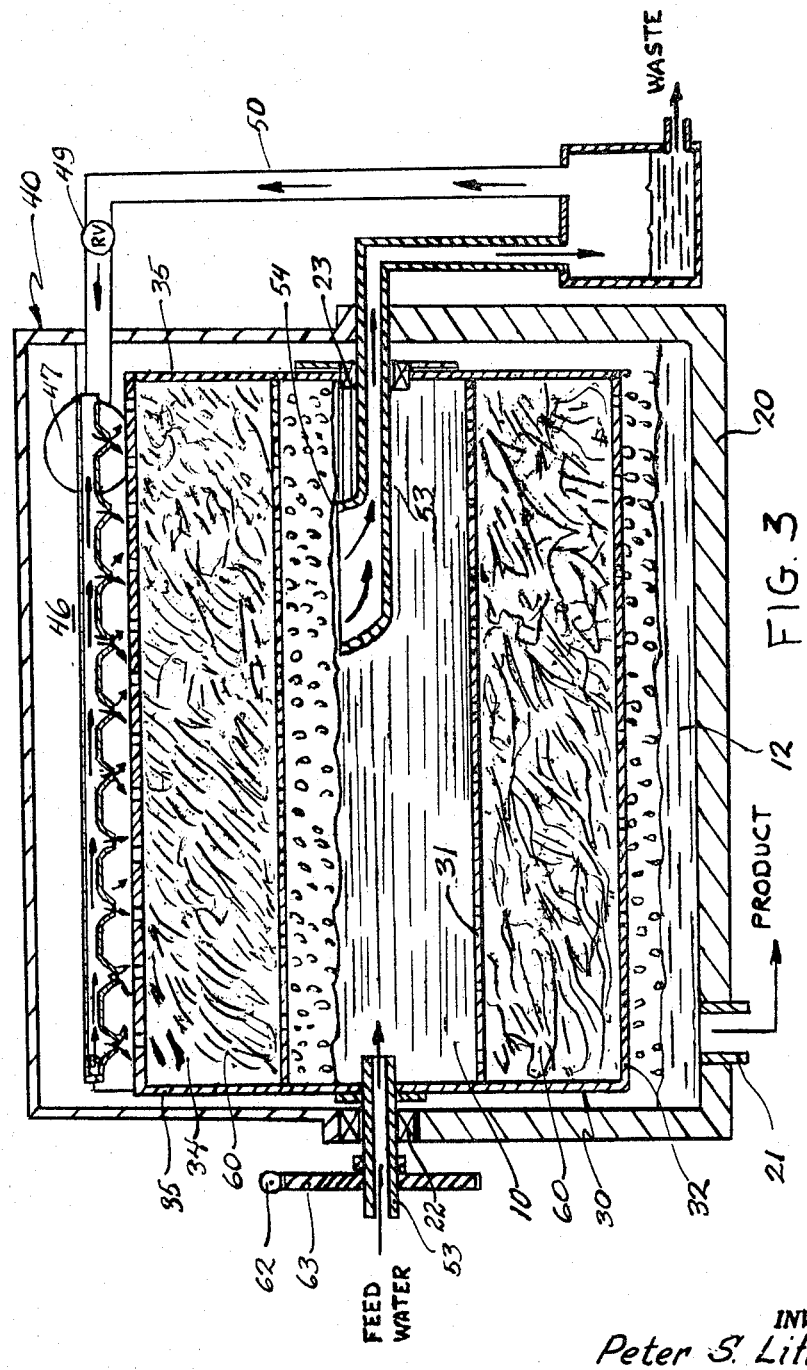

3,266,630
APPARATUS FOR PURIFYING WATER
Peter S. Litt, Albuquerque, N. Mex., assignor of twelve percent each to Walter B. Hobbs, Ralph K. Ball, and Watson D. Harbaugh, all of Evanston, Ill.
Filed May 28, 1962, Ser. No. 198,355
12 Claims. (Cl. 210—394)

The present invention relates to the method and apparatus for reclaiming water from sewage, brackish, stagnant, industrial wastes, sea and alkaline water including solutions having different specific gravities and different pH readings, ionized and non-ionized.

The principal object is to provide a low cost and high volume method and apparatus that reduces in p.p.m. (parts per million) the total of the above contaminant that may be present, and to produce irrigation water of about 1,400 p.p.m. as derived from an initial water mixture rated as "sea water" and having as high as 35,000 p.p.m. Drinking water of less than 300 p.p.m. of inert minerals can be derived and soft water of less than 60 p.p.m. (60 p.p.m. is equal to 3.5 or 3½ grains hardness), can be derived depending upon the adjustment and capacity for which the apparatus is constructed.

The invention contemplates retarding the movement of ionized particles in a body of water which they contaminate as the water is moved along a predetermined path of travel, and to separate the contaminant from the water temporally and spatially.

The invention also contemplates the use of inexpensive and readily available additives when desired, as where more organic particles are present than ionized particles are present to attract them, to assist and accelerate reclamation of the water and the additives from an organically polluted body of water, which additives are quite safe to water users and are readily detected even in small quantities as a telltale in the water, if reclamation equipment becomes damaged.

The invention further contemplates reducing all particles in a body of water that are contaminants to a common denominator of ionization behavior and by capillary diffusion permitting pure water to flow from the solution more rapidly through a porous body than the particles can travel, and collecting purified water from the remaining portion of the body in single or multiple stages.

Furthermore, the invention in its operation involves no heat exchange procedure either to distill or freeze the contaminated water, which procedures are conventional methods confronted with heavy use of external energy, corrosion of equipment and residue of toxic materials employed in the process and objections from public health officials.

The invention contemplates a product water of low cost that is free from residue and can be derived with standardized equipment embodying the invention which handles water contaminated with any known contaminants prevalently found in any known bodies of water of useful size.

Another object of the invention is to provide a continuous running high volume, small sized water purifying system which employs vapor to blow back contaminated water to purge passages through which product water accelerates ahead of ions in their movement through the passage from a body of water contaminated by the ions.

Another object is to conserve purging vapor in the capillary diffusion system of this invention to induce a greater yield of product water from water contaminated with ionized particles.

A further object of the invention is to provide a water reclamation system which is built of inexpensive materials and operates long periods of time without attendance.

Another object of the invention is to provide an improved method of reducing sea water, sewage and industrial waste water to a useful grade of water at slight expense, except for pumping and the use of small amounts of inexpensive additives, such as calcium hydroxide and calcium sulphate, which can be done in a batch system or in a continuous running system of any volume or size.

The invention also provides an apparatus for purifying water whose constructional costs are a small fraction of conventional equipment; whose moving parts are few and essentially comprise conventional pumps, motors and automatic control elements; whose external energy requirements in large installations are a small fraction of that required for conventional equipment and little or no energy is required in small volume devices such as survival equipment for families, individuals and space travel; and whose apparatus is made of inexpensive corrosion and vermin proof materials, including non-frangible dielectric materials, if desired.

Other objects of the invention will be appreciated from the description of the drawings in which several embodiments of the invention are illustrated schematically for carrying out various phases of the process, in which:

FIG. 3 is a section taken on line 3—3 in FIG. 2.

Figure 1:
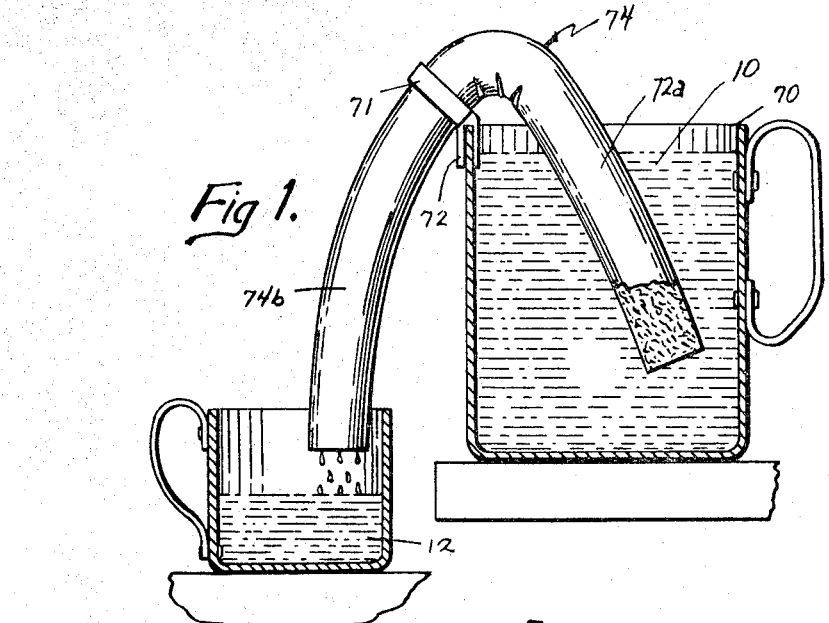
FIG. 1 is a diagrammatical view of a batch apparatus embodying the invention in its simplest form for survival or family kits.

For a better understanding of the invention, it should be noted that all water contaminants, other than the heavy or gross solids which can be readily removed by mechanical filters, can be rated according to their ionization factor in a water solution. Some elements such as organic wastes which include microscopic plant and animal microorganisms, and both soluble and insoluble hydrocarbons including oils and dyes, do not ionize readily in water while other compounds partially soluble in water such as calcium compounds including calcium hydroxide $Ca(OH)_2$ and calcium sulphate $CaSO_4$ not only ionizes in water adequately in small quantities, but also have an affinity for organic materials.

In the present invention the use and presence of calcium sulphate is preferred because it is neutral and does not change the pH of the solution. When calcium hydroxide is used, it may be desirable to add another stage for removal of calcium hydroxide which remains in the solution depending upon the end use of the product water. Consequently, $CaSO_4$ will be referred to herein for purposes of description by way of example and not by way of exclusion of other known ionizing compounds found present in or which may be added to contaminated water, because in one of the embodiments of the invention where sodium is present in the water, calcium hydroxide can be used as an additive, as will be explained.

$CaSO_4$ is soluble in water up to 2,500 p.p.m. at certain temperatures and altitudes and to the extent that a solution is attained the compound is disassociated to form in the solution $Ca^{++}$ and $SO_4^{--}$. Any $CaSO_4$ present in excess of that which is in solution is not disassociated but remains in suspension without ionization. Where organic materials are present and readily ionizable compounds are slight $CaSO_4$ should be added in amounts sufficient to provide an ionization effect for all organic materials present. Such accommodates all organic contamination generally experienced. Then when intimate contact is established between the ionized particles and the dissolved organic particles, the action of the organic material in the process of the invention is controlled by the action of the ionic material in subsequent treatment of the solution including capillary diffusion, electrical polarity attraction and electrostatic repulsion.

I have found that molecules of water flow more rapidly through a capillary lattice of an inert or dielectric material than the ions which contaminate the water. The water, having little if any charge and being itself nonconductive has a freedom of action in the presence of dielectric materials and easily wets them. On the other hand, ions in solution having high electrical charges have a tendency to refrain from an intimacy with dielectric materials wetted by water. Also, it has been noted that even the ions and pure water tend to diffuse in the solution.

Thus, when the ion contaminated water begins to flow through the capillary lattice, the ions are reluctant to enter the dielectric lattice and tend to cluster near the face of the lattice surface, nor can the cluster travel as rapidly as single water molecules because the dielectric material hinders its movement in the capillary passages and the ion clusters do not like break up while the water flows freely ahead, wetting the capillary passages and outdistancing the ions in their movement. This provides a result I refer to as "capillary diffusion." Relative distances of travel remain proportional under varying rates of liquid flow for a given capillary lattice, but with air under pressure passed through the capillary passages to blow them free of liquid and purge them after the solution is jettisoned, a drying effect occurs in the capillary passages which permits a rather quick and thorough expulsion of the ions lingering in the passageways. Whether this is due in part to reassociation of ions is not clear because a high degree of purging occurs with capillary materials that are not readily dried. However, in the event any ions reassociated as crystals might become trapped in the capillary lattice and not blow free, a subsequent brief flush of pure water, whether as a mist or in droplets carried through by air pressure, will clear the capillary passages quite well for a repeated step of purification of contaminated water by capillary diffusion.

In applications where small amounts of product water are desired on the order of a gallon per day, a small refillable container can be employed with a wick made of materials capable of capillary diffusion such as fibrous glass, nylon and other similar inert materials, organic or inorganic. One end of the wick is placed in the container in the solution and the other end is laid over the side of the container where water dripping therefrom can be caught and used. The wick must be compacted enough to form capillary passages and not have any passages of a size which serve merely as siphon conduits.

Without any electrical energy being required the wick in contact with the surface of the quiescent body of the solution will pass pure water by capillary diffusion over the side of the container ahead of the movement of the ions in the wick, the pure water traveling faster through the wick than the ions. The recovery of product water will continue until the ions begin to come through and drip from the wick. Thereupon, the wick is removed, purged and returned to its original position to repeat the operation. The quantity of water recovered in a given length of time is proportional to the cross sectional area of the wick and the time cycle between purgings is proportional to the length of the wick. For example, a compact wick one inch in diameter immersed two inches in contact with the impure water mixtures and having a depending portion of six inches on the drip side will produce 60 cc. of potable water in an hour from sea water.

Such a device is shown in FIG. 1 where a survival kit is shown which operates without electricity and only requires personal attention. A mess kit container 70 is filled with solution 10 and a felt-like wick 74 made of fibrous materials is passed part way through a support ring 71 forked as at 72 to be received in supported relationship on the edge of the container. As thus supported, one end 74a is immersed in the solution and the other end 74b is permitted to hang freely above a collector cup.

A molecule of $H_2O$ will travel as much as 15 times faster than an ionized particle through the wick and because of this differential in travel a product water will separate from the ions and flow at a faster rate through the wick than the ions. Consequently, with capillary diffusion the water will drop from the wick for a period of time before ionized particles begin to come through. When ions begin to come through, the wick 74 is lifted free, purged, wrung as dry as possible and whipped in the air to free it of contamination as much as possible. The container 70 is emptied and refilled with more solution and the wick returned to its working position.

The length of the portion 74b of the wick exposed beyond the water level is significant. Generally speaking, ions potentially travel at about 5 centimeters per second while the $H_2O$ will travel as much as 75 centimeters per second in a liquid medium. Thus, with capillary diffusion in a depending wick portion 74b of fibrous material such as nylon and wool having a depending length of five inches, the water will begin to drip in a few minutes and continue in an amount depending upon the diameter of the wick and the density of the wick. Less density increases the speed of flow and lessens the time between purgings. One inch diameter will provide three pints in twelve hours. After the purged wick is reintroduced, flow will begin in approximately fifteen minutes and 30 cc. will flow during the next fifteen minutes at the rate of 2 cc. per minute before a saline trace appears. The longer the end 74b of the wick the longer the time between purgings. The less the rise distance from the surface of the water to the edge of the container 70, the sooner the water begins to flow.

Figure 2:
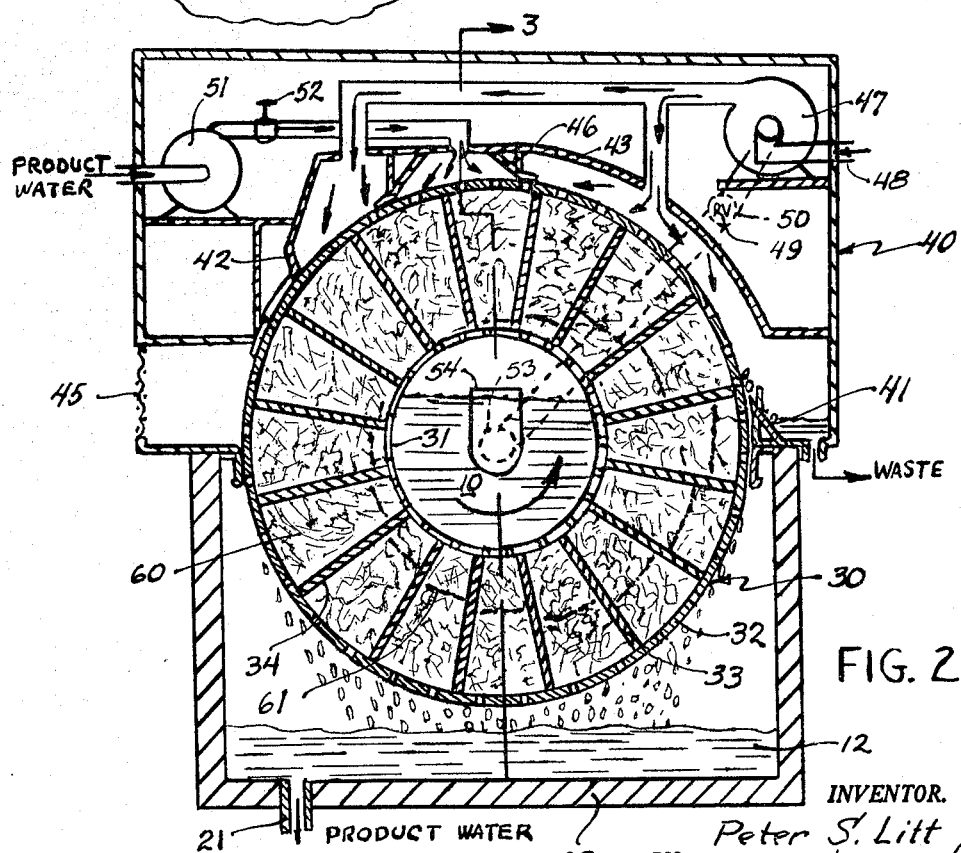
FIG. 2 is a diagrammatical view of an apparatus embodying the invention for continuous operation.

A continuous operation apparatus is shown in FIG. 2 embodying the invention to recover product water 12 from a feed water 10 contaminated in any of the ways mentioned herein. A trough 20 made either of metal or of reinforced concrete is provided to collect product water and supply same to a point of use through its outlet 21. The trough can be mounted on a foundation or trenched into the ground for support.

Journalled at opposite ends by bearings 22 and 23 on the end walls of the trough 20 is a drum 30 preferably fabricated with two concentric foraminous stainless steel tubes, an inner one 31 and an outer one 32. Radially disposed imperforate divider walls 33 interconnect the tubes in assembled relationship, as by welding, and provide longitudinally extending compartments 34 disposed peripherally around the drum through which fluid may move radially in either direction. The compartments are closed at their ends by rings 35 at opposite ends of the drum upon which the bearings 22 and 23 are mounted.

Covering the trough 20 and the upper portion of the drum 30 is a hood 40 baffled to direct air under pressure to flow radially inwardly and downwardly through the uppermost compartments to establish air pressure within the inner tube 31. The hood is removable for servicing the apparatus and the drum 30 can be either removed with the hood or left in place on the trough as desired whenever the hood is removed.

The baffles in the hood which direct and control the air flow and its application to the periphery of the drum can be described in connection with the direction of drum rotation. Noting that the drum rotates as shown by the arrow in a counter-clockwise direction, a baffle 41 is located at three o'clock and is inclined so as to slide in sealed relationship with the periphery of the drum as urged into sealing relationship by the air pressure in the hood. Baffle 41 catches and carries to waste any water moving out onto the surface of the drum above it.

A ceiling member 43 interconnects the baffle 41 with a baffle 42 that is located at ten o'clock and in cooperation with the baffles provides a manifold 43 across the top of the drum to expose it to air pressure present in the hood. The remaining outer area of the drum and the trough 20 are exposed to atmospheric pressure through a dust screen 45.

In some instances, it is found desirable to provide a secondary manifold 46 at approximately eleven o'clock through which water spray or vapor may be directed against the periphery of the drum 30. If desired, a separate source of air pressure may be provided to drive the water spray through the compartments but the pressure already in the manifold has been found to be adequate.

It is desirable to provide from five to eight pounds per square inch pressure in the manifold and from it derive approximately a two or three pound drop across the compartments, with the inner tube pressure stabilized at from two to six pounds above atmospheric pressure.

Centrifugal pumps can be employed economically to provide these pressures. A blower 47 takes replenishing air from the atmosphere through inlet 48 and maintains said pressure drop or differential through a pressure regulator valve 49 located in an inlet branch conduit 50 which connects the interior of the inner tube 31 with the blower. Water is supplied to the spray head 46 through the pump 51 as controlled by the valve 52, it only being necessary to supply a small and conservative amount of water to purge the compartments.

The compartments are filled with an inert dielectric diffusion material which could be fibrous or cementitious. However, it is preferred that the filler units 60 be substantially rigid to withstand the action of the pressures employed and that capillary passages, preferably from one to five microns in size, be provided therethrough. Where fibers are provided such are preferably supported in a binder and include, cellulose, nylon, fiberglass and wool which can be blown into the form desired. Where cementitious materials are used, it is preferred to employ a mixture of exfoliated perlite particles of approximately 20 mesh or more supported in a binder of plaster of Paris or the like.

Feed water is introduced through conduit 53 into the interior of the inner tube 31 by a pump (not shown) to a level indicated by an overflow waste water tube 54 which as seen in FIG. 3 also serves in part to conduct air from the interior of tube 31 to the blower 47.

In operation, with the interior supplied with feed water 10, with no air pressure on the drum idle, water will begin to flow radially downwardly and outwardly through the diffusion material units 60. Ions will also begin to flow, but slowly, as shown by the dotted lines 61 in the various diffusion units to indicate the advancing ion front. Then when the drum is rotated by the worm drive gear 62 acting on the worm gear 63 to move it and the drum in counter-clockwise direction (FIG. 2), the speed of rotation is adjusted so that ions do not reach the outer surface of the drum. Thus, in the lower half, pure water drips through ahead of the ions by capillary diffusion, and before the ions begin to appear the units 60 successively pass to the top half where the feed water and ions in the top units drain back into the center compartment. This readies the diffusion units progressively to pass again to the lower half recurrently for the reclamation of further product water by capillary diffusion.

Thus, a continuous operation is provided in which a product water can be recovered of a grade acceptable for some purposes merely by rotation of the drum.

However, it is to be noted that care has to be taken with this arrangement and some ions ultimately may get through because on the back-flow of water into the top diffusion units of units 60, the water also runs ahead of the ions and some ions can be left in the units to be picked up by product water near the outer surface of the diffusion units.

Therefore, I prefer to provide air pressure to blow the liquid in the uppermost diffusion units 60 back into the center tube 31 when they pass through the upper half of their travel. The air pressure not only clears the capillary passages of liquid but picks up ions and any reassociated particles (crystallized) and blows them back thereby leaving little if any to be entrained as product water again begins to flow when the units return again to the lower half of drum movement. Moreover, if desired, a small portion of the product water may be supplied by the spray head to assure a clean purging of the diffusion units continuously or intermittently, as desired.

Furthermore, it is to be noted that with the forced flow of feed water, the sectional flow area in each unit 60 is gradually increasing radially outwardly for the faster flow of water ahead of the ions. Furthermore, when the feed water remaining in the uppermost units is blown inwardly by the air and water mist, the sectional flow area becomes a decreasing one and the pressure and flow rate increases with an increasing scouring activity favorable to purging.

With the utilization of air pressure the speed of rotation of the drum can be increased because the application of pressure assists the flow of product water ahead of the ions to the extent that the clustering of ions at the beginning of the capillary passages increases and further inhibits ion pursuit of product water. The yield of product water is thereby increased more than proportionally for certain usable grades of water, it being appreciated that the speed of rotation of the drum is related to the radial thickness of the diffusing units as well as the pressures employed. The deeper the diffusing unit, the slower the drum can be rotated, or the higher the pressure that can be used. Moreover, flow conditions of product water can be controlled by varying the size of the capillary passage from the center to the outside of the drum.

In some respects we are not able to account fully for the improved results which are obtained by the method and apparatus of this invention, and it should be understood that any attempt to analyze the theory which is believed to be responsible for these results is to be construed not as defining a mode of operation, but merely as a possible explanation of certain physical, electrical, or chemical phenomena which have been observed.

Having thus described the invention and various embodiments thereof, it will be appreciated by those skilled in the art how the objects and operation of the invention set forth herein are fulfilled and accomplished and how various and further embodiments and modifications can be made, including by reference those of my co-filed application Serial No. 194,135, without departing from the spirit of the invention, the scope of which is commensurate with the appended claims.

What is claimed is:

1. An apparatus for the purification of contaminated water comprising:
    a drum having a body of contaminated water in it,
    capillary diffusion means encompassing said body of water and having a portion submerged in contact with said body and another portion remote from said body of water,
    said capillary diffusion means comprising a material having a porosity capable of moving water by capillary action alone from said body of water,
    means for collecting water flowing from said other portion,
    means for rotating said drum to change positions of said portions, and
    means for purging said remote portion of contaminated water.

2. An apparatus for the purification of contaminated water comprising:
    a container having a body of contaminated water in it,
    a porous element surrounding said body of water having a portion progressively submerged in contact with said body and another portion progressively removed from said body of water,
    said porous element comprising a fibrous mass compacted to provide a fine porosity throughout its thickness capable of moving water by capillary action alone, means for collecting water flowing from said other portion by capillary action alone,
means for rotating said porous element progressively to change the positions of said portions, and
pressure means for purging said removed portion of contaminated water therein.

3. In an apparatus for purifying a solution of contaminated water in a continuous operation comprising:
a container having a porous wall of capillary passages defining a compartment for said solution and an inlet conduit and an outlet conduit therefor,
means including said outlet conduit for maintaining a predetermined level in said compartment,
means for moving the porous wall progressively into and out of contact with said solution in said compartment for the solution to flow by capillary action alone through said capillary passages with capillary diffusion, and
means for collecting water flowing from said capillary passages.

4. In a device for purifying a solution of contaminated water comprising:
a drum having a porous wall of dielectric material defining capillary passages therethrough and a compartment therewithin,
means for maintaining a predetermined level of solution in said compartment in contact with the lowermost capillary passages,
means for moving the wall progressively to change the capillary passages that are lowermost,
means for collecting water conducted through the capillary passages by capillary diffusion, and
means for removing from uppermost capillary passages any solution therein.

5. The device called for in claim 4 in which the last means mentioned includes an expansible fluid under pressure and an element applying said fluid under pressure over an upper surface portion of said drum.

6. The device called for in claim 4 in which the last means called for therein includes an element for applying product water over an external area of said drum above said predetermined level, and pressure means for forcing said applied product water to flow through capillary passages engaged by said applied product water.

7. The device called for in claim 4 in which said capillary passages are less than five microns in size.

8. The device called for in claim 4 in which said dielectric material comprises a mixture of perlite and plaster of Paris.

9. In a device of the class described a capillary diffusion means comprising:
a drum having a wall defining a central compartment to receive contaminated water, and
said wall being composed of a dielectric material defining capillary passages extending through said wall interconnecting said compartment and the outer surface of the drum through which water molecules are moved under the influence of gravity and capillary action alone.

10. In a device of the class described a capillary diffusion means comprising:
a drum having concentric foraminous walls defining radially spaced compartments the innermost of which receives feed water, and
a dielectric material between said walls defining capillary passages interconnecting said walls through which water is moved with capillary diffusion under the influence of capillary action from said innermost compartment to the outer surface of said drum.

11. In a device of the class described a capillary diffusion means comprising:
a drum having a plurality of capillary diffusion segments defining a wall having a central compartment therein to receive feed water, and
segments being composed of an inert dielectric material defining capillary passages extending from said compartment to the outer surface of said drum through which water is moved with capillary diffusion under the influence of capillary action.

12. In a device of the class described comprising:
a container for collecting product water,
a drum rotatably mounted on said container and having a central compartment for feed water,
hood means over said drum for applying air under pressure to said drum within a predetermined area,
means for applying product water to said drum within said predetermined area,
said drum having a porous wall of an inert dielectric material defining capillary passages interconnecting the central compartment and the outer surface of said drum,
means for maintaining a predetermined level of feed water in said compartment,
means for rotating said drum, and
means for maintaining a predetermined gage pressure in said compartment.

References Cited by the Examiner

UNITED STATES PATENTS

| | | | |
|---|---|---|---|
| 2,204,072 | 3/1938 | Dean | 210—24 |
| 2,322,917 | 10/1943 | Jordan et al. | 210—404 |
| 2,355,822 | 7/1944 | Rugeley | 210—508 X |
| 2,450,522 | 10/1948 | North | 210—403 |
| 2,988,503 | 6/1961 | Milton et al. | 210—24 |
| 3,013,666 | 12/1961 | Krynski | 210—404 |

OTHER REFERENCES

1960 Saline Water Conversion Report, by Office of Saline Water, United States Department of the Interior, January 1961; pages 37 and 38 relied upon.

MORRIS O. WOLK, *Primary Examiner.*

E. G. WHITBY, *Assistant Examiner.*